(12) United States Patent
Park (10) Patent No.: US 9,812,056 B2
(45) Date of Patent: Nov. 7, 2017

(54) DISPLAY RESOLUTION NEGOTIATION

(71) Applicant: Google Inc., Mountain View, CA (US)

(72) Inventor: Keun young Park, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 179 days.

(21) Appl. No.: 14/446,389

(22) Filed: Jul. 30, 2014

(65) Prior Publication Data

US 2015/0371364 A1 Dec. 24, 2015

Related U.S. Application Data

(60) Provisional application No. 62/016,322, filed on Jun. 24, 2014.

(51) Int. Cl.
*G09G 3/20* (2006.01)
*G06T 3/40* (2006.01)
*G06F 3/14* (2006.01)

(52) U.S. Cl.
CPC ......... *G09G 3/2092* (2013.01); *G06F 3/1454* (2013.01); *G06T 3/4092* (2013.01); *G09G 2340/0407* (2013.01); *G09G 2340/0442* (2013.01); *G09G 2340/145* (2013.01); *G09G 2370/04* (2013.01); *G09G 2380/10* (2013.01)

(58) Field of Classification Search
CPC ............. G06F 3/14; H04N 21/43615; H04N 21/43622; H04N 5/775; H04N 9/8042; H04N 7/181; H04N 19/59; H04N 5/2628; H04N 21/2181; H04N 21/2662; H04N 21/6125; H04N 7/0122; H04N 9/3188; H04N 2201/325; H04N 2201/3273; G09G 2340/0407; G09G 2340/0414; G09G 2340/0421; G09G 2340/145; G09G 2370/027; G09G 2380/10; G09G 3/002; G09G 5/005; H04M 1/72561; H04M 1/72527; H04M 1/6075; H04M 1/72533; H04M 11/00; H04M 1/6083; H04M 1/6091; G08G 1/096883; B60R 2325/205; B60R 11/0235; B60R 11/0258; G06T 3/40; G06T 3/4053

See application file for complete search history.

(56) References Cited

U.S. PATENT DOCUMENTS 6,714,591 B1 * 3/2004 Katata .................. G06T 9/20
348/399.1
2006/0015813 A1 * 1/2006 Chung .................. G06F 17/214
715/201
2006/0077120 A1 * 4/2006 Domi .................... G06F 3/0488
345/2.3

(Continued)

OTHER PUBLICATIONS

Dennis P. Curtin, Pixel s and Images, 2007.*

*Primary Examiner* — Haixia Du
(74) *Attorney, Agent, or Firm* — Morris & Kamlay LLP (57) ABSTRACT

In a projected architecture system, a mobile device may be responsible for providing the video that is displayed on a vehicle's infotainment system's display. The resolution and/or aspect ratio of the remote display may not be supported by the mobile device. An encoder, based on the display resolution, may render one or more video frames that a decoder coupled to the infotainment system can scale to a resolution compatible with the remote display.

21 Claims, 4 Drawing Sheets

(56) References Cited

U.S. PATENT DOCUMENTS

| | | | |
|---|---|---|---|
| 2008/0068446 A1* | 3/2008 | Barkley | H04N 7/147 348/14.07 |
| 2008/0100741 A1* | 5/2008 | Fujita | G09G 5/227 348/445 |
| 2014/0118222 A1* | 5/2014 | Barrett | G01C 21/3688 345/2.2 |
| 2015/0179150 A1* | 6/2015 | Andrysco | G09G 5/391 345/156 |
| 2016/0012795 A1* | 1/2016 | Banski | G06F 3/14 345/520 |

* cited by examiner

DISPLAY RESOLUTION NEGOTIATION

CROSS REFERENCE TO RELATED APPLICATION

This application claims priority to provisional application No. 62/016,322, filed on Jun. 24, 2014, the disclosure of which is hereby incorporated by reference in its entirety.

BACKGROUND

Display sizes can vary greatly from small screens on mobile devices to large displays typically associated with high resolution television screens. In particular, a display associated with an infotainment system in a vehicle may have a resolution that is not supported by a mobile device. The mobile device may be utilized to drive the infotainment system's display as part of a projected architecture. If the mobile device cannot support the resolution of the infotainment system's display, content may not appear on the display as it should. Moreover, the aspect ratio of the display may differ from that of the mobile device. A resolution may be referred to in terms of the number of pixels. For example, a 1024×768 display is a display 1024 pixels wide and 768 pixels high. Similarly, an aspect ratio may refer to a ratio of a display's physical picture width to the physical picture height. Thus, a display with a resolution of 1280×720 and a display resolution of 1024×768, each with a 16:9 aspect ratio may differ in their shape. The former display has square pixels while the latter has rectangular pixels.

BRIEF SUMMARY

According to an implementation, a mobile device may receive an indication of a resolution of a remote display that is connected to an infotainment system. A resolution of the remote display and/or an aspect ratio of the remote display may be determined to be different from a support resolution and/or a supported aspect ratio of the mobile device. At least one frame may be rendered at a display resolution that is a subset of an encoder resolution and that accounts for the aspect ratio of the remote display. The rendered one or more frames may be sent to a decoder that is coupled to the infotainment system.

In an implementation, a device is provided that includes a processor connected to an encoder. The processor may be configured to receive an indication of a resolution of a remote display that is connected to an infotainment system. The processor may determine that at least one of a resolution of the remote display and an aspect ratio of the remote display may differ from a supported resolution and/or a supported aspect ratio of the mobile device. The processor may be configured to send a rendered frame to a decoder coupled to the infotainment system. The encoder may be configured to render the frame at a display resolution that is a subset of an encoder resolution and that accounts for the aspect ratio of the remote display.

In an implementation, a system according to the presently disclosed subject matter includes a means for receiving, by a mobile device, an indication of a resolution of a remote display that is connected to an infotainment system. The system may include a means for determining that at least one of a resolution of the remote display and an aspect ratio of the remote display differ from a supported resolution and supported aspect ratio of the mobile device. The system may include a means for rendering a frame at a display resolution that is a subset of an encoder resolution and that accounts for the aspect ratio of the remote display. The system may include a means for sending the rendered frame to a decoder coupled to the infotainment system.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

A mobile device that drives the display of an infotainment system may not support the resolution of the display and/or the aspect ratio of the display. In a projected architecture system, the mobile device may be responsible for rendering content that is to be displayed on the infotainment system's display. When a user inputs or issues a command or otherwise interacts with the infotainment system's display, the input and/or interaction is sent to the mobile device. The mobile device may update the display based on the input and/or interaction.

Typically, a mobile device's encoder can support scale pixels, meaning that an equal number of pixels are rendered horizontally as are vertically. The resolution of the display may be varied by adding scale pixel blocks in different configurations. For example, mp4 file format supports 16×16 pixel blocks (horizontal×vertical pixels). Multiples of the 16×16 pixel blocks may be compatible with the mp4 format such as a 1600×720 resolution display. An encoder for mp4 may support only resolutions that can support scale pixel resolutions using the 16×16 pixel blocks. Some displays, however, may not have scale pixels. For example, they may have an aspect ratio of 2:1, meaning that the horizontal pixel length is twice as long as the vertical pixel length. Thus, an encoder may not support both a resolution and an aspect ratio of the infotainment system's display. The infotainment system's display may have a decoder resolution that determines the display's resolution. The decoder may receive video frames rendered by the mobile device's encoder and decode the video frames so that the infotainment system can display them. As at least a portion of an encoder may be implemented as a hardware module, the hardware module may not be designed to be flexible enough to be programmed to support more resolutions. Moreover, it would be difficult to for software encoders to verify random resolutions.

Figure 1:
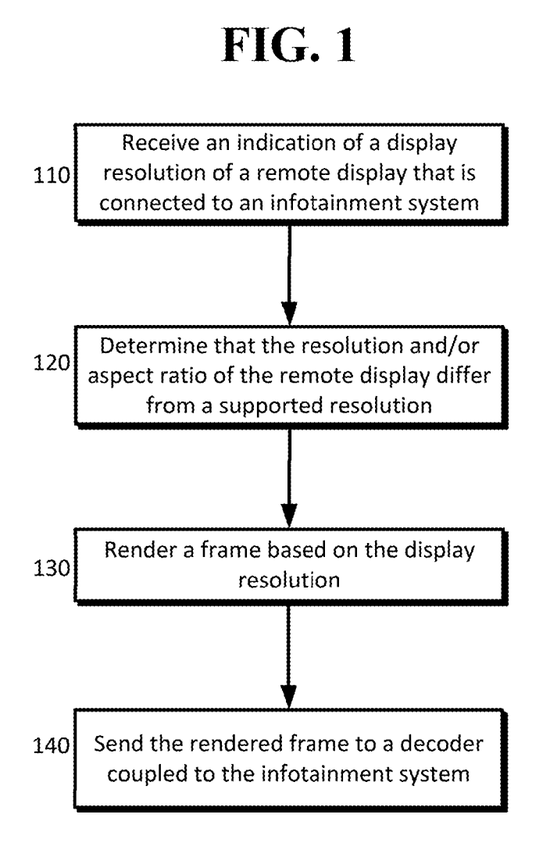
FIG. 1 shows an example process for rendering one or more video frames for output on a remote display of an infotainment system as disclosed herein.

In an implementation, as shown in the example provided in FIG. 1, a mobile device may receive an indication of a remote display that is connected to an infotainment system at 110. The mobile device may be responsible for providing the video frames that are shown on the infotainment system's display. The mobile device may be connected to a vehicle by a wired or wireless connection. The connection with the motor vehicle may be utilized to provide the display video frames. A decoder associated with the infotainment system display may receive video frames rendered by the mobile device's encoder. During the initial connection of the mobile device to the vehicle, the infotainment system may provide the mobile device with information about the infotainment system such as the decoder resolution, an indication of how a user may interact with the infotainment system (e.g., a touchscreen, a voice command, a button, or a knob), and the systems of the vehicle to be handled by the infotainment system (e.g., temperature control, seat adjustments, rear seat entertainment system settings, etc.).

The display resolution and/or aspect ratio of the remote display may be determined to differ from a supported resolution and/or supported aspect ratio at 120. As described earlier, the mobile device may support only a set of specific resolutions, such as only those resolutions that are compatible with mp4 format (e.g., 16×16 pixel blocks). As an example, the mobile device may support a resolution of 1920×1080. The remote display may be at a resolution of 800×480, a resolution not supported by the mobile device. Moreover, the aspect ratio of the remote display may be 2:1 which differs from the scale pixels of the mobile device (e.g., a 1:1 ratio). In some configurations, the mobile device may have a list of supported resolutions. The received indication of display resolution may be compared to the list of supported resolutions to determine if the mobile device can render video frames for the display without modifying the encoding resolution or selecting a portion of the encoding resolution. In some instances, the display resolution may be supported by the mobile device; however, the aspect ratio of the display may be non-scale. The encoder may scale the rendered video frames to account for the aspect ratio of the remote display.

Figure 2:
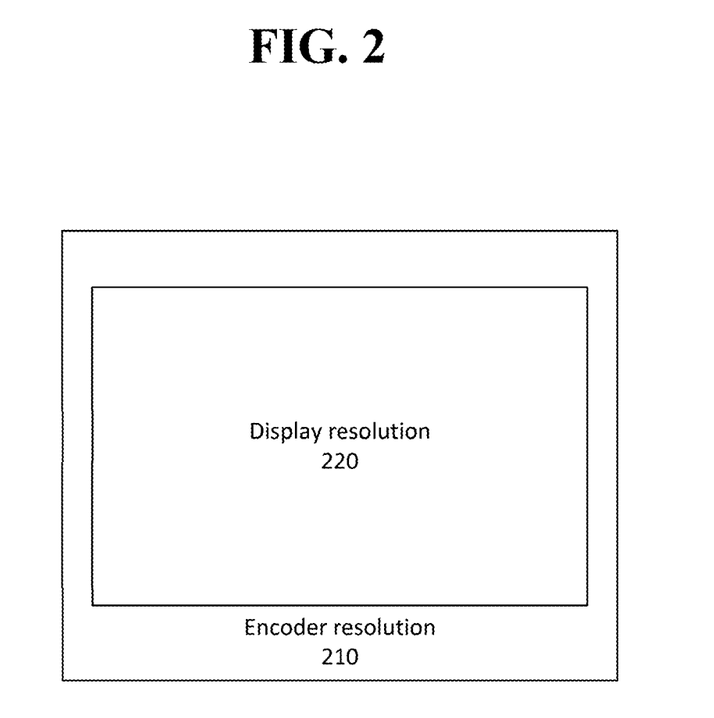
FIG. 2 shows an example of the relationship between an encoder resolution and a display resolution.

One or more frames may be rendered at a display resolution at 130. The display resolution may be a subset of an encoder resolution. Moreover, the rendering may account for the aspect ratio of the remote display. FIG. 2 shows an example of the relationship between the encoder resolution 210 and the display resolution 220. The encoder resolution may be greater than or equal to the number of pixels of the display resolution in the horizontal and/or vertical direction. Thus, the display resolution may be a portion of the encoder resolution. The encoder may render a portion of the encoder resolution. For example, if the encoder resolution is 800×480 and the target display (e.g., the display resolution of a remote display is 640×480 and has an aspect ratio of 1:1, then the area outside of the 640×480 portion of the encoder may be left empty or blank. The encoder may ignore the portion of the encoder resolution that does not overlap with the display resolution. The encoder may, therefore, send images in the appropriate 640×480 resolution to the decoder.

As another example, the encoder may render the horizontal and/or vertical pixels to accommodate the aspect ratio of the remote display. Thus, if the remote display supports 800×480 with a 2:1 aspect ratio, the encoder may render a portion of the encoder resolution to generate one or more rendered video frames with a resolution of 1600×480. The 1600×480 may be rendered using scale pixels.

The mobile device may send the rendered one or more frames to a decoder coupled to the infotainment system at 140. Continuing the above example, the decoder may downscale the received 1600×480 screen to 800×480 because the display has an aspect ratio of 2:1. Thus, the rendering performed at 130 may account for the aspect ratio by selecting the appropriate display resolution to render by the encoder.

Figure 3:
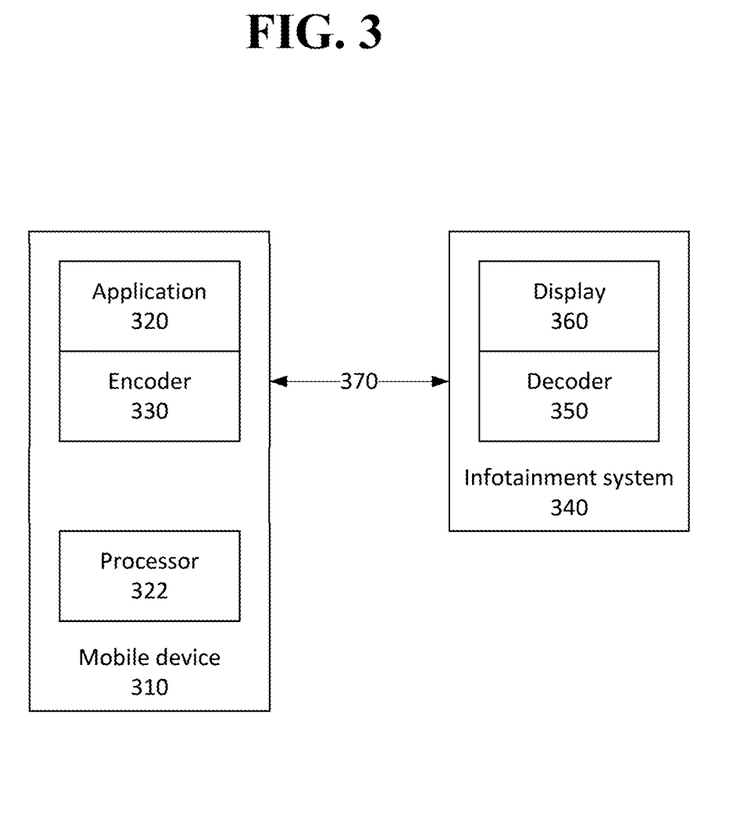
FIG. 3 shows an example device that includes a processor and an encoder that renders one or more video frames for output on a remote display of an infotainment system as disclosed herein.

A device is disclosed 310, as shown in the example provided in FIG. 3, which may include a processor 322 and an encoder 330. The device may be a mobile device 310 (e.g., a smartphone, tablet, laptop computer) that is connected to a vehicle and is responsible for driving a remote display 360 of the infotainment system 340. For example, the remote display 360 may be integrated into a motor vehicle and display navigation instructions from a navigation application or other application 320 operating on the mobile device 310. A user may interact with the remote display 360 by touch, voice, and or button presses. The input into the infotainment system 340 may be received by the mobile device 310.

The processor 322 of the device may be connected to the encoder. The processor 322 may be configured to receive an indication of a display resolution of the remote display 360 that is connected to an infotainment system 340. The processor 322 may determine that a display resolution and/or an aspect ratio of the remote display 360 differ from a supported resolution and/or supported aspect ratio of the mobile device 310. For example, the mobile device may compare the encoder resolution to the display resolution. The encoder 330 may render one or more video frames based on the display resolution. The rendering may account for the aspect ratio of the remote display 360, for example, if the remote display 360 utilizes non-scale pixels. The processor 322 may send a rendered frame to a decoder 350 coupled to the infotainment system 340.

Figure 4:
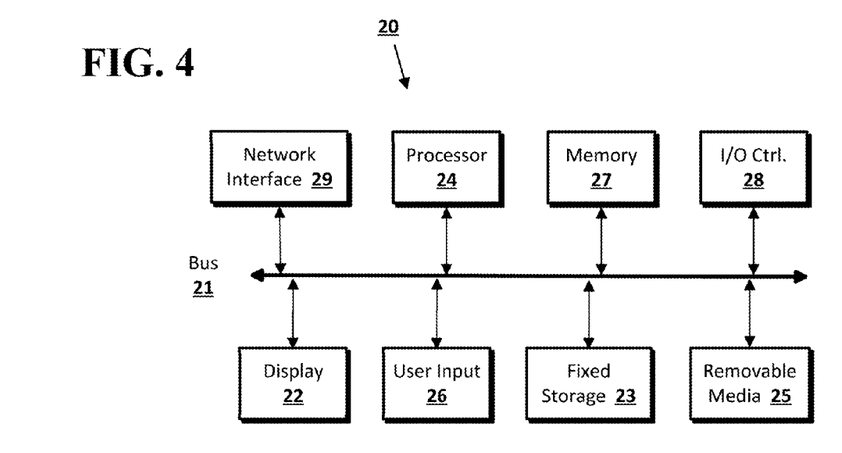
FIG. 4 shows a computer according to an implementation of the disclosed subject matter.

Implementations of the presently disclosed subject matter may be implemented in and used with a variety of component and network architectures. FIG. 4 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an Internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
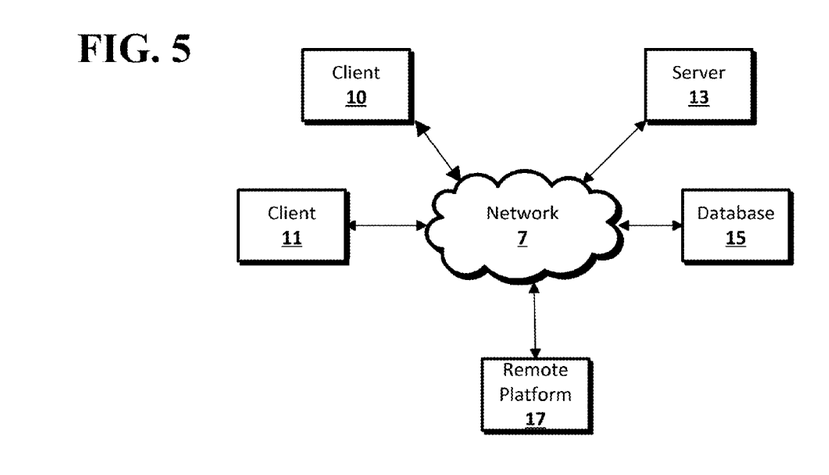
FIG. 5 shows a network configuration according to an implementation of the disclosed subject matter.

FIG. 5 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
receiving, by a mobile device, an indication of a display resolution of a remote display that is connected to an infotainment system;
determining, by the mobile device, that at least one of the display resolution of the remote display and an aspect ratio of a pixel of the remote display differs from a supported resolution of the mobile device and a supported aspect ratio of a pixel of the mobile device;

rendering, by the mobile device, a frame for display on the remote display display, the rendering comprising:
  determining a dimension of a resolution for the frame, the determining the dimension being based on a product of: i) a dimension of the display resolution of the remote display multiplied by ii) a dimension of the aspect ratio of the pixel of the remote display, and
  selecting a portion of the frame, the portion being in the supported resolution of the mobile device, the selecting being based on the dimension of the resolution for the frame and on the display resolution of the remote display, wherein the portion substantially maximizes an area of an image in the frame; and
  sending the frame from the mobile device to a decoder coupled to the infotainment system.

2. The method of claim 1, wherein the display resolution of the remote display is based on a decoder resolution.

3. The method of claim 1, wherein the mobile device supports scale pixels.

4. The method of claim 1, wherein the decoder scales down at least one measurement of the frame based on the display resolution.

5. The method of claim 1, further comprising determining a decoder resolution, wherein the decoder resolution comprises the display resolution of the remote display.

6. The method of claim 1, wherein the mobile device drives the remote display of the infotainment system.

7. The method of claim 1, further comprising determining the frame to be rendered by an encoder.

8. The method of claim 1, wherein the dimension of the aspect ratio of the pixel of the remote display is greater than a corresponding dimension of the supported aspect ratio of the pixel of the mobile device.

9. The method of claim 1, wherein:
  the dimension of the aspect ratio of the pixel of the remote display comprises a length of the pixel of the remote display;
  a corresponding dimension of the supported aspect ratio of the pixel of the mobile device comprises a length of the pixel of a display of the mobile device; and
  the dimension of the aspect ratio of the pixel of the remote display is greater than the corresponding dimension of the supported aspect ratio of the pixel of the mobile device.

10. The method of claim 1, wherein the dimension of the resolution for the frame comprises a number of pixels of a width of the resolution for the frame or a number of pixels of a height of the resolution for the frame.

11. The method of claim 1, wherein a display of the mobile device comprises scale pixels, the remote display comprises non-scale pixels; and the rendering the frame for display on the remote display comprises rendering the frame in the scale pixels.

12. The method of claim 1, wherein a display of the mobile device comprises scale pixels, the remote display comprises non-scale pixels; and the rendering the frame for display on the remote display comprises rendering the frame in the scale pixels; and the dimension of the aspect ratio of the pixel of the remote display is greater than a corresponding dimension of the supported aspect ratio of the pixel of the mobile device.

13. A system, comprising:
  a processor, of a mobile device, connected to an encoder, of the mobile device, the processor configured to:
    receive an indication of a display resolution of a remote display that is connected to an infotainment system;
    determine that at least one of the display resolution of the remote display and an aspect ratio of a pixel of the remote display differs from a supported resolution of the mobile device and a supported aspect ratio of a pixel of the mobile device; and
    send a frame to a decoder coupled to the infotainment system; and
  the encoder configured to:
    render the frame for display on the remote display, the rendering comprising:
      determining a dimension of a resolution for the frame, the determining the dimension being based on a product of: i) a dimension of the display resolution of the remote display multiplied by ii) a dimension of the aspect ratio of the pixel of the remote display, and
      selecting a portion of the frame, the portion being in the supported resolution of the mobile device, the selecting being based on the dimension of the resolution for the frame and on the display resolution of the remote display, wherein the portion substantially maximizes an area of an image in the frame.

14. The system of claim 13, wherein the display resolution of the remote display is based on a decoder resolution.

15. The system of claim 13, wherein the mobile device is configured to support scale pixels.

16. The system of claim 13, wherein the decoder is configured to scale down at least one measurement of the frame based on the display resolution.

17. The system of claim 13, the processor further configured to determine a decoder resolution, wherein the decoder resolution comprises the display resolution of the remote display.

18. The system of claim 13, wherein the system is configured to drive the remote display of the infotainment system.

19. The system of claim 13, the processor further configured to determine the frame to be rendered by the encoder.

20. A non-transitory, computer-readable medium storing instructions that, when executed by a processor, cause the processor to perform operations comprising:
  receiving, by a mobile device, an indication of a display resolution of a remote display that is connected to an infotainment system;
  determining, by the mobile device, that at least one of the display resolution of the remote display and an aspect ratio of a pixel of the remote display differs from a supported resolution of the mobile device and a supported aspect ratio of a pixel of the mobile device;
  rendering, by the mobile device, a frame for display on the remote display, the rendering comprising:
    determining a dimension of a resolution for the frame, the determining the dimension being based on a product of: i) a dimension of the display resolution of the remote display multiplied by ii) a dimension of the aspect ratio of the pixel of the remote display, and
    selecting a portion of the frame, the portion being in the supported resolution of the mobile device, the selecting being based on the dimension of the resolution for the frame and on the display resolution of the remote display, wherein the portion substantially maximizes an area of an image in the frame; and
  sending the frame from the mobile device to a decoder coupled to the infotainment system.

21. The non-transitory, computer-readable medium of claim 20, wherein the rendering the frame further comprises:

encoding content within the portion of the frame, and preventing encoding of content outside the portion of the frame.

\* \* \* \* \*